Dec. 15, 1970  E. JENSEN  3,546,910
LOCK-SEAM HELICAL TUBING
Filed May 2, 1967  7 Sheets-Sheet 1
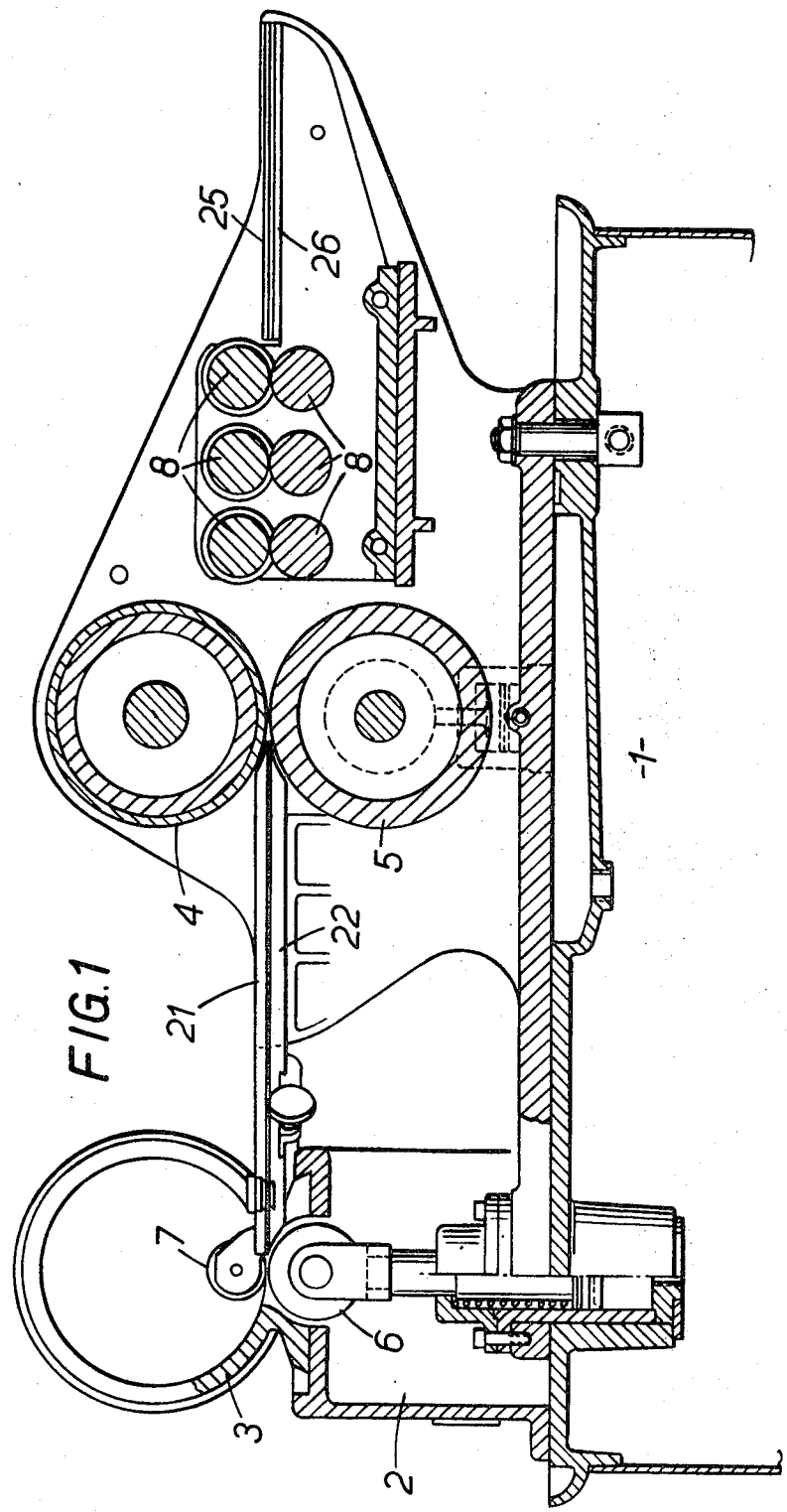
ERLING JENSEN - Inventor
By Hall, Pollock & Vande Sande - Attorneys

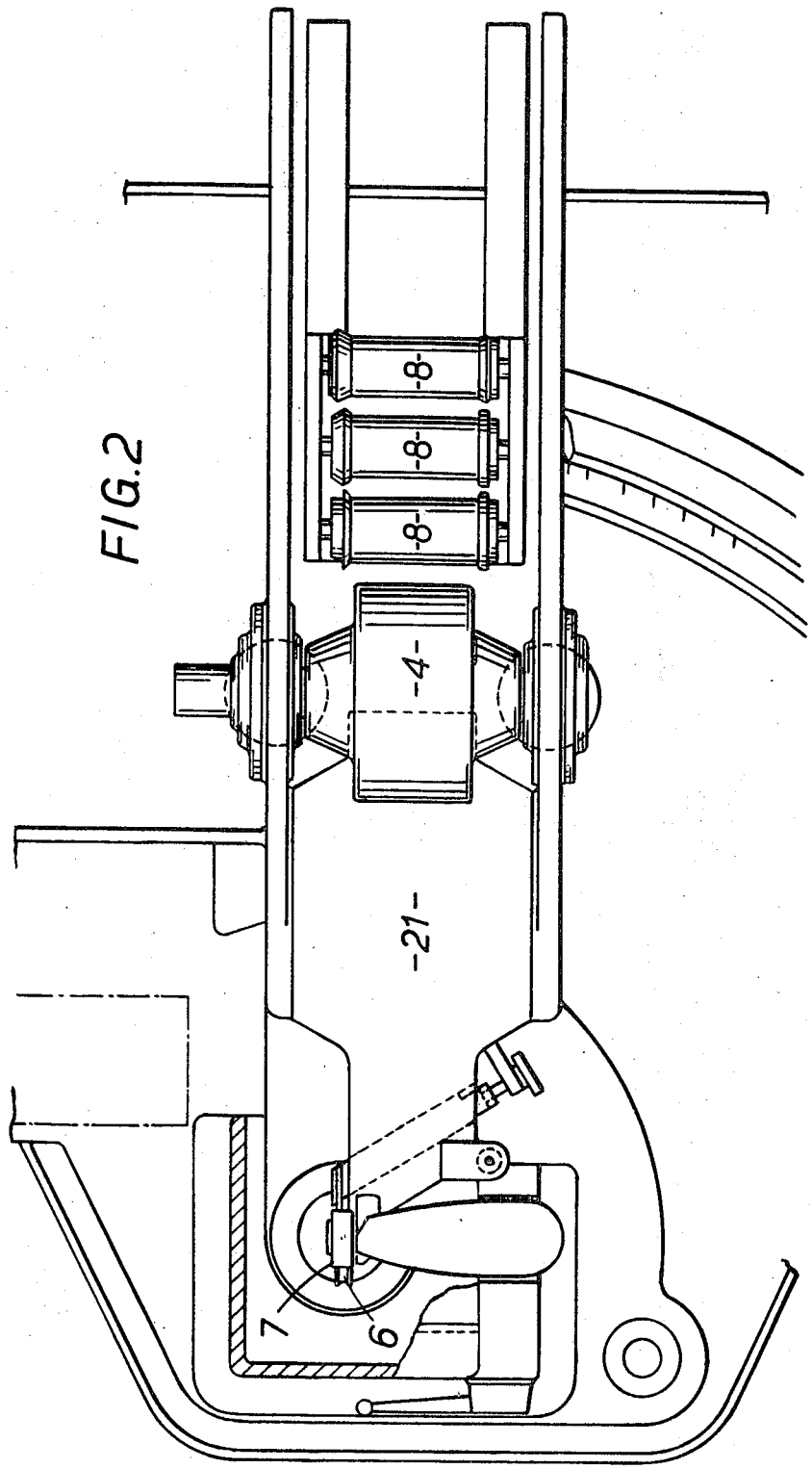

Dec. 15, 1970       E. JENSEN       3,546,910
LOCK-SEAM HELICAL TUBING
Filed May 2, 1967                7 Sheets-Sheet 3
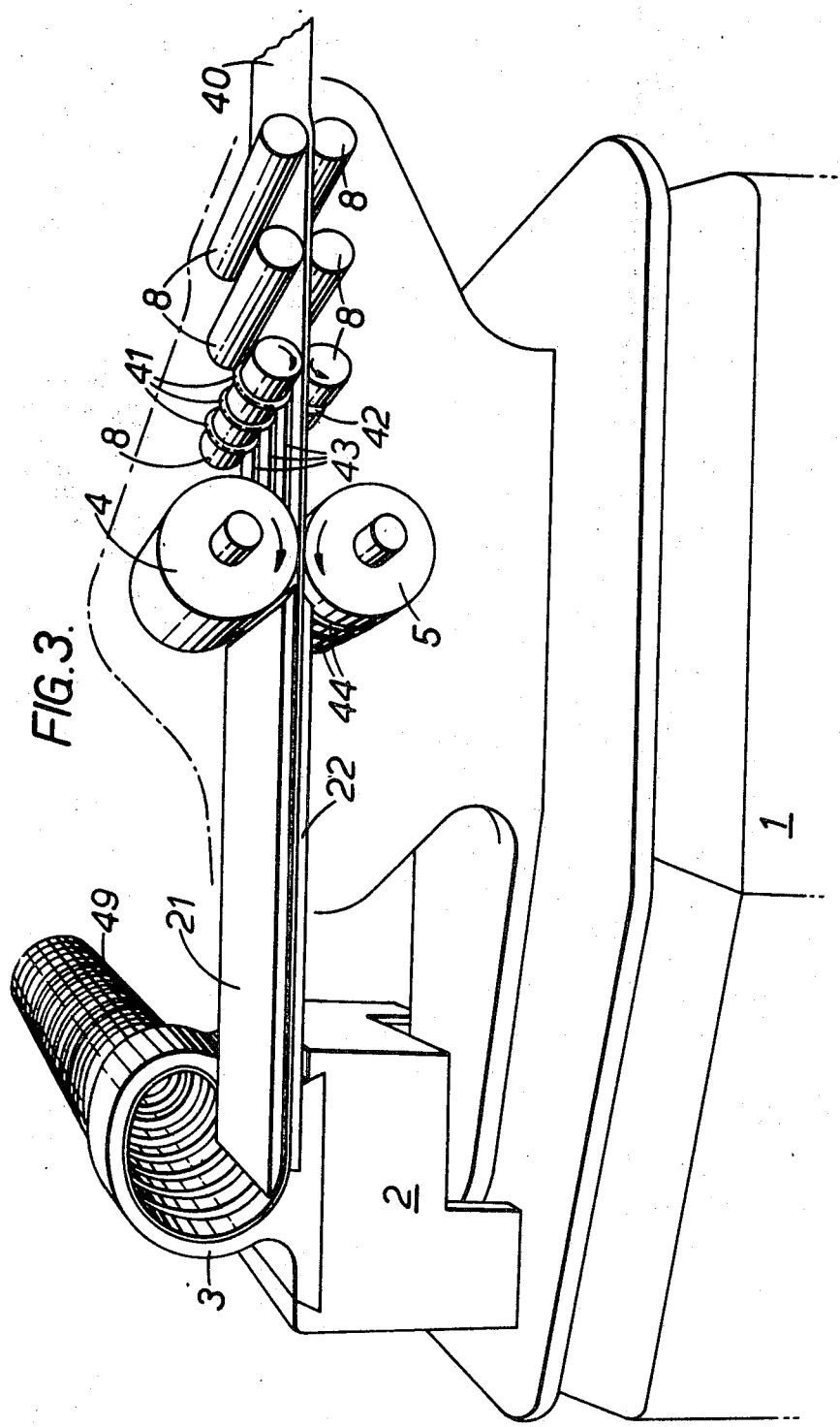
ERLING JENSEN — Inventor
By Hall, Pollock & Vande Sande — Attorneys

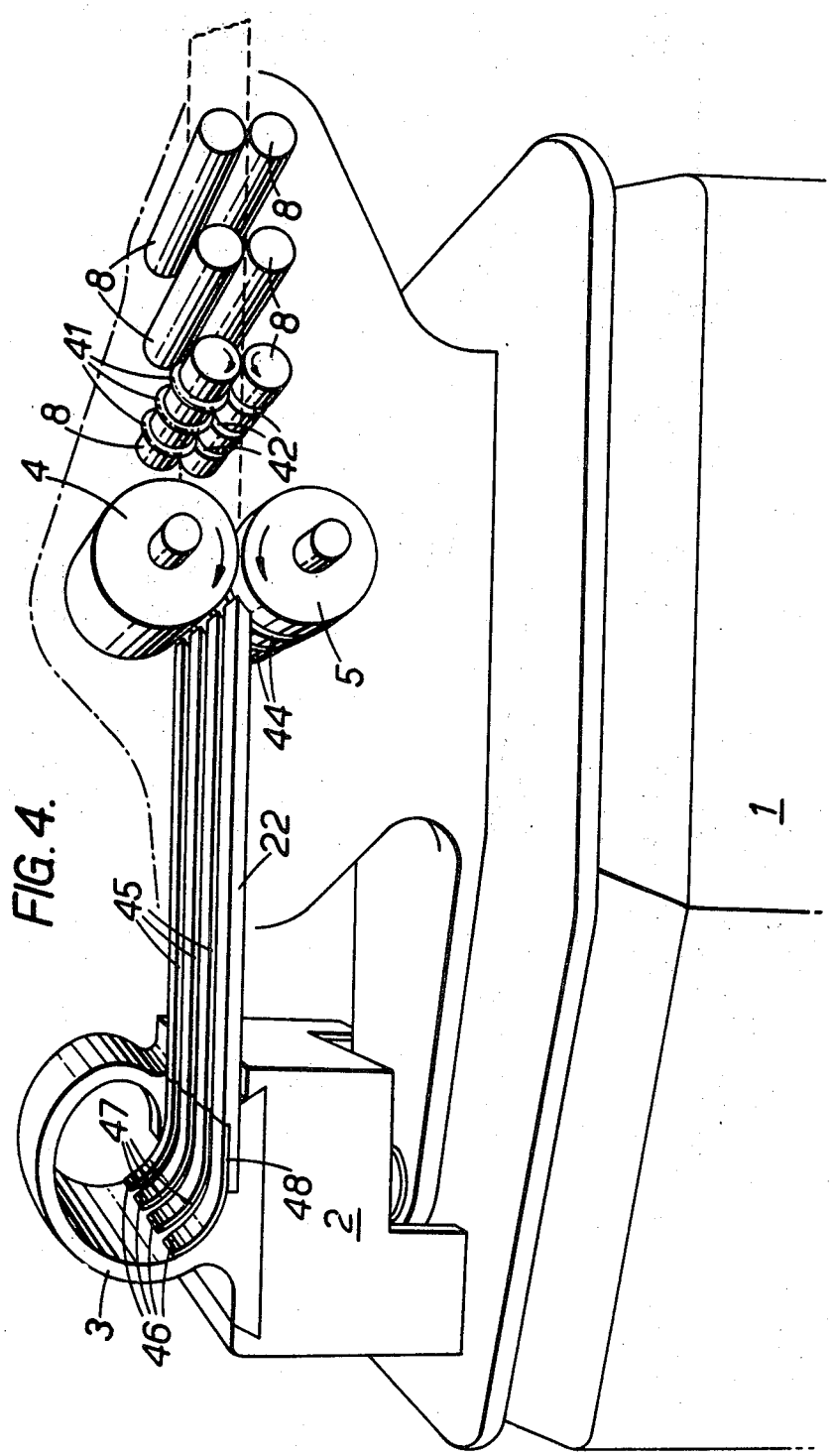

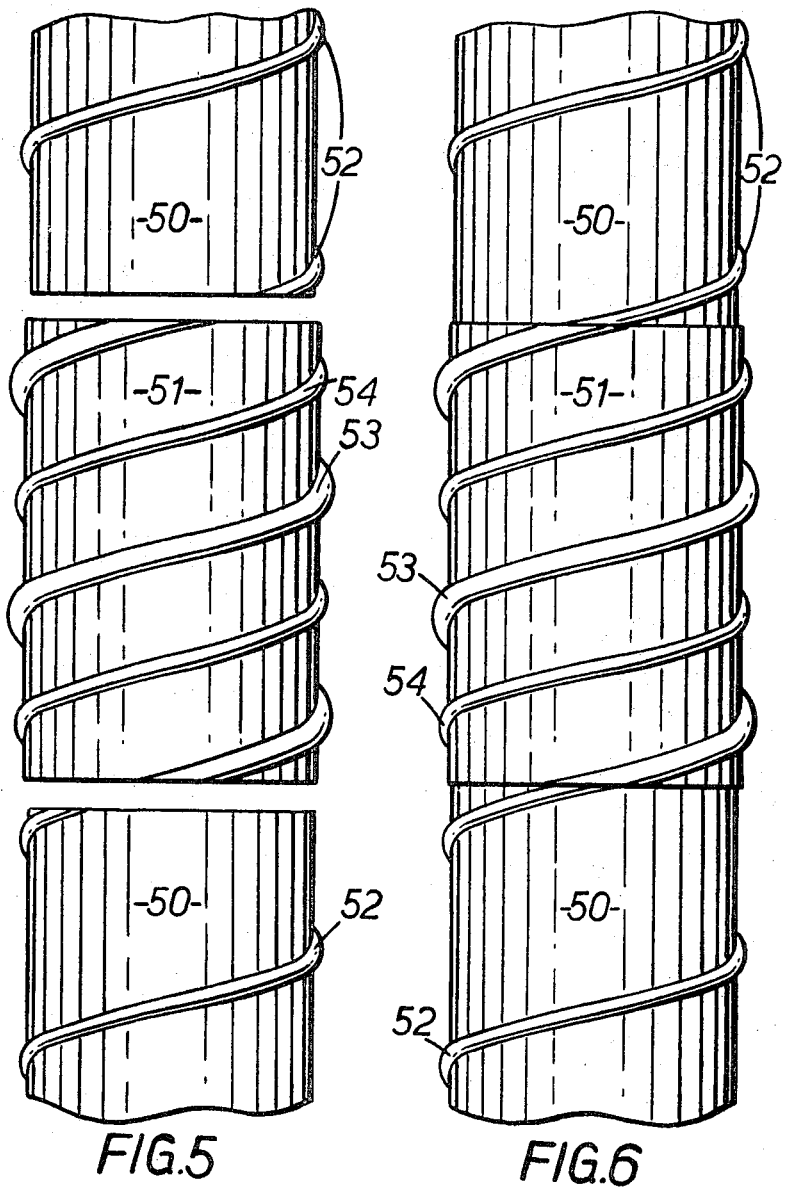

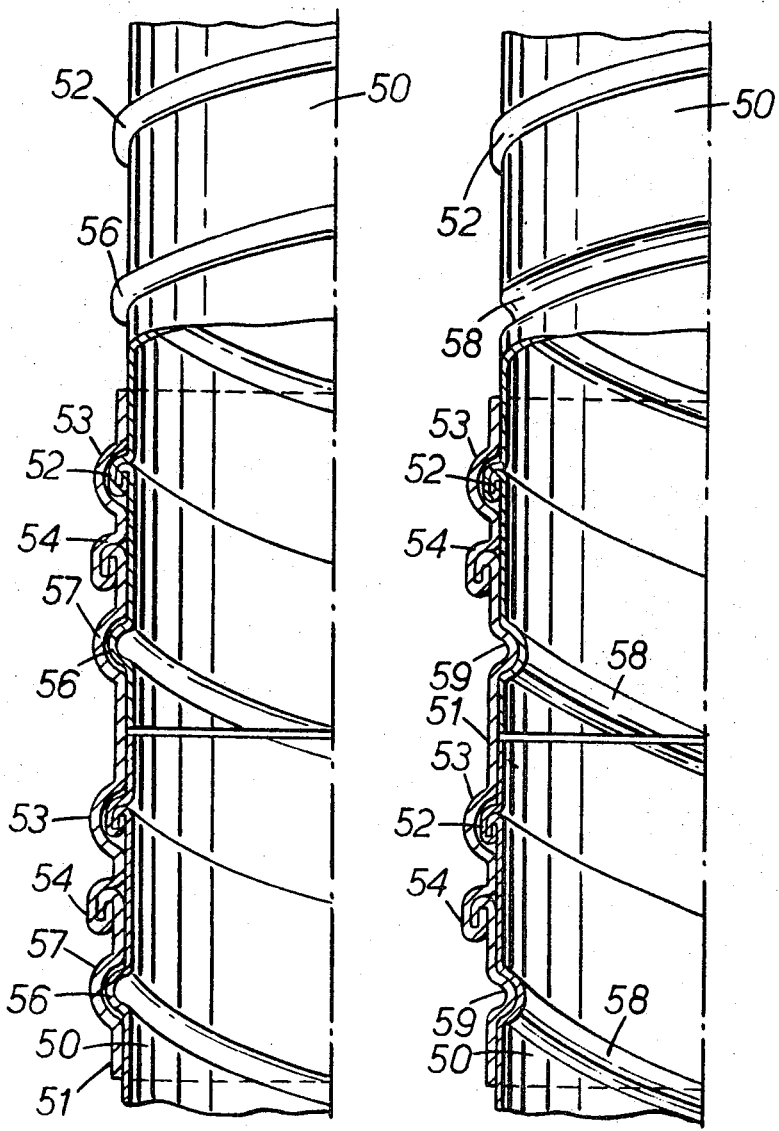

United States Patent Office 3,546,910
Patented Dec. 15, 1970

---

3,546,910
LOCK-SEAM HELICAL TUBING
Erling Jensen, Fribourg, Switzerland, assignor, by mesne assignments, to Protol S.A., Geneva, Switzerland, a Swiss company
Filed May 2, 1967, Ser. No. 635,533
Int. Cl. B21c *37/12*
U.S. Cl. 72—49                    1 Claim

ABSTRACT OF THE DISCLOSURE

A machine for producing, from metal strip, locked seam helical tubing with at least one helical corrugation by forming at least one longitudinal corrugation in the metal strip prior to its being fed to a forming head where it is shaped into a helix. This tubing may be used as a connecting piece to connect two lengths of locked seam helical tubing, to produce voids in concrete, as a prestressed cable cover, or as trunking for electrical conduits.

---

This invention relates to locked seam helical tubing and to machines for producing such tubing.

Machines for the production of locked seam helical tubing, with an external lock-seam, are described in the specification of, for example, British Pats. Nos. 830,504, 830,505, 959,889 and 1,034,421 and it is an object of this invention to provide a machine for producing, from continuous metal strip, locked seam helical tubing with at least one helical corrugation.

According to one aspect of this invention there is provided a machine for producing, from continuous metal strip, locked seam helical tubing, the machine including a head having an internal surface shaped to define the helix pitch of the metal strip and adapted to guide the metal strip into a helical path so that upon negotiating substantially a single turn of a helix marginal parts of the metal strip are brought into mating relationship, pinching rollers for gripping between them the marginal parts of the metal strip when they are in mating relationship, and feed and preforming rollers for feeding the metal strip to the head, for forming at least one longitudinal corrugation in the metal strip and for forming complementary interengageable marginal parts along the metal strip.

In use, the tubing produced by the machine in accordance with this invention has a single start corrugation if only one longitudinal corrugation is formed by the preforming rollers and a multi-start corrugation if they produce more than one longitudinal corrugation.

It is known to produce locked seam helical tubing with a single or multi-start helical corrugation by bringing one or more rollers into engagement with the surface of fabricated tubing as it issues from the forming head of a machine, but the depth of corrugations which can be produced by this method is limited. If the corrugations produced by this method are too deep, the lock-seam between adjacent turns is broken open.

Preferably there are provided separate feed rollers and preforming rollers.

Suitably the preforming rollers comprise a pair of rollers shaped to produce the complementary interengageable marginal parts and also to produce the longitudinal corrugation or corrugations.

Preferably the feed rollers are arranged to draw the metal strip through the preforming rollers and to push feed it to the forming head, at least one of the feed rollers being formed with a groove or grooves intended to provide a passage for the corrugation or corrugations.

According to another aspect of this invention there is provided a connecting piece for locked seam helical tubing comprising a tube formed with a helical corrugation to receive the seam of the locked seam helical tubing.

In the case of tubing formed with external corrugations, additional external corrugations are formed in the connecting piece. If the tubing is formed with internal corrugations, the connecting piece may be formed with corresponding internal corrugations.

The connecting piece is primarily intended for interconnecting two end-to-end lengths of tubing, and it will be appreciated that the lengths are screwed in opposite senses into the ends of the connecting piece until their ends meet as near as possible to the center of the connecting piece.

The internal diameter of the connecting piece is fractionally greater than the external diameter of the lengths of tubing to be interconnected to provide a sliding or push fit as required. Additional sealing means may also be provided if an hermetically sealed junction is required, or to prevent loosening. Where the lengths of tubing are of different diameters, the connecting piece may be formed as two parts welded together end-to-end.

The connecting piece may also be employed for connecting a length of tubing to, for example, a tubular junction. In this and in similar cases, one end of the connecting piece may be welded or otherwise secured to the junction or the like.

Locked seam helical tubing with helical corrugations is also suitable for producing voids in concrete and in this case, the diameter of the tubing is relatively large and a relatively small number, e.g. three, of relatively wide corrugations are provided. These corrugations give the tubing mechanical strength and permit the use of a lighter gauge of metal strip.

Locked seam helical tubing with helical corrugations are also suitable for use as prestressed cable covers in prestressed concrete and as trunking for electrical cables. In this case the diameter of the tubing is relatively small, and a relatively large number, e.g. four to six, of relatively narrow corrugations are provided. These corrugations give the tubing mechanical strength and flexibility.

Embodiments of this invention will now be described by way of example with reference to the accompanying drawings of which:

FIG. 1 is a sectional side elevation of the upper part of a machine for producing helical seam tubing, the base of the machine being shown broken. (The machine shown in FIG. 1 does not embody this invention);

FIG. 2 is a plan view of FIG. 1;

Figure 7:
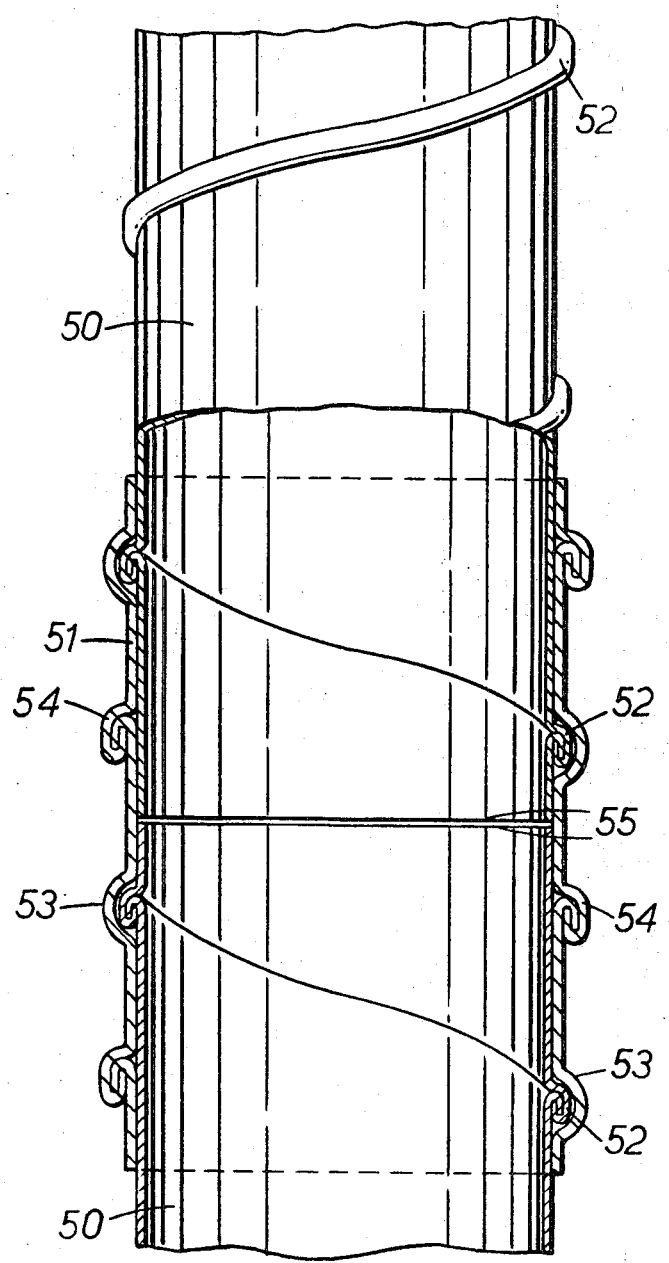

FIG. 3 shows the forming rollers 8, feed rollers 4 and 5, guide plates 21 and 22 and forming head 3 of the machine shown in FIGS. 1 and 2 modified so that the machine embodies this invention. In this figure, a metal strip 40 is shown;

FIG. 4 shows the same components as FIG. 3 other than the guide plate 22 but in this figure the metal strip 40 is omitted;

FIG. 5 is an elevation showing two lengths of locked seam helical tubing about to be interconnected by a connecting piece;

FIG. 6 is an elevation showing the lengths duly interconnected by being screwed into the connecting piece;

FIG. 7 is a largely sectional elevation corresponding to FIG. 6;

FIG. 8 is a fragmentary section showing a connection with an externally corrugated length of tubing; and, FIG. 9 is a fragmentary section showing a connection with an internally corrugated length of tubing.

The machine shown in FIGS. 1 and 2 is identical to that shown in British Pat. 1,034,421 and FIGS. 1 and 2 are almost identical to FIGS. 1 and 2 of British Pat. No. 1,034,421. This machine will now be described briefly but for a full description British Pat. No. 1,034,421 should be read. A metal (normally steel) strip is drawn between a pair of guide plates 25 and 26 and through a set of three pairs of preforming rollers 8 by a pair of feed rollers 4 and 5. The preforming rollers 8 are shaped in complementary fashion to produce, at opposite edges of the metal strip, a marginal flange and a marginal channel to receive the flange as will be explained. The metal strip is wider than the feed rollers 4 and 5 so that the flange and channel do not pass between the rollers 4 and 5. The feed rollers 4 and 5 push the preformed metal strip between two guide plates 21 and 22 and against a polished forming head 3 which has a shape defining a complete helix turn. The metal strip is thus shaped into a helix and the arrangement is such that the marginal flange of one turn mates with marginal channel of the adjacent turn. A pair of pinching rollers 6 and 7 engage the mating parts and pinches them together so that the machine produces locked seam helical tubing which issues rotating from the head 3. The head 3 is carried by a pedestal 2 and the whole machine by a base 1.

Referring now to FIGS. 3 and 4, the machine shown in FIGS. 1 and 2 is modified in that the pair of preforming rollers 8 nearest to the feed rollers 4 and 5 are modified to corrugate the metal strip (indicated by the numeral 40). The ends of the rollers 8 are still shaped to produce the marginal flange and the channel, but for simplicity this is not illustrated either on the rollers 8 or on the metal strip 40. The upper roller 8 nearest the feed rollers 4, 5 is formed with three rings 41 which register with three annular grooves 42 in the lower roller 8 nearest the feed rollers 4 and 5 to produce three corrugations 43 in the metal strip 40. It will be appreciated that any number of corrugations can be produced by suitable numbers of rings 41 and grooves 42. The feed roller 5 is provided with annular grooves 44, and the guide plate 22 is provided with longitudinal grooves 45, through which the corrugations 43 pass. The head 3 is provided with four curved strips of metal 46 placed adjacent and parallel to each other to provide grooves 47 which register with the grooves 45. The strips 46 are set into the guide plate 22 as indicated at 48 and serve to guide the strip 40 into the head 3. The metal strip issues from the head 3 as rotating locked seam helical tubing 49 having external corrugations. It will be appreciated that if internal corrugations are to be provided, the lower roller 8 is formed with the rings 41 and the upper roller 8 with the grooves 42 and further that grooves are formed in the rollers 4 and the guide plate 21 instead of the roller 5 and the guide plate 22. In this case the strips 46 are not provided. It will also be appreciated that, with suitable modifications, internal and external corrugations can be produced simultaneously. It will be appreciated that if external corrugations are formed, a slightly larger head 3 is required for a given diameter of tubing but this presents no difficulty.

The machine described with reference to FIGS. 1 to 4 produces the longitudinal corrugations in the metal strip by drawing the corrugations out of the strip i.e. the material of the strip is stretched and the width of the strip does not change. Furthermore the three corrugations are produced by the same pair of rollers. In a modification, at least one of the corrugations is formed by bending the material to take up the shape of the corrugation without stretching it and in this case the width of the strip is reduced. Alternatively, the corrugations are formed partially by drawing and partially by forcing the strip to take up the shape of corrugation, and in this case the reduction of the width of the strip is less. In one example, four or five pairs of preforming rollers are provided, and the strip material 40 is initially 20% wider than its final width. The corrugations are partly formed by the first pair of rollers, solely by bending the strip, to take up say 50% of the depths of the corrugations without drawing so that the strip width is reduced. The corrugations are completed by drawing in the further rollers. The marginal parts are formed after the strip has been reduced to its final width. Forming the corrugations by bending the strip to take up the shape of the corrugations has the advantage that deeper corrugations can be provided and that less power is required to operate the preforming rollers.

One use of corrugated tubing produced by the machine described with reference to FIGS. 1 to 4 or in the preceding paragraph is as a connecting piece for connecting two lengths of locked seam helical tubing. Referring now to FIGS. 5 to 7, two lengths 50 of locked seam helical tubing produced by the machine shown in FIGS. 1 and 2 without the modifications of FIGS. 3 and 4, and to be connected by a connecting piece 51 produced by a machine incorporating the modifications of FIGS. 3 and 4, are each formed with a helical lock-seam 52. The connecting piece 51 is formed with one external helical corrugation 53 and as the lengths 50 are screwed, in opposite senses, into the connecting piece 51, the seams 52 are received by the corrugation 53. The connecting piece 51 is likewise formed with a helical lock-seam 54, but as this is also external it does not interfere with the passage of the lengths 50.

When the lengths 50 are screwed home, as shown in FIGS. 6 and 7, their inner ends 55 should meet as nearly as possible at the center of the connecting piece 51.

In the alternative arrangement shown in FIG. 8, external corrugations 56 in the lengths 50 are accommodated by a second external corrugation 57 formed in the connecting piece 51.

In the further alternative arrangement shown in FIG. 9, internal corrugations 58 in the lengths 50 are engaged by an internal corrugation 59 formed in the connecting piece 51. It will be appreciated, however, that the corrugation 59 may be omitted.

A further use of tubing produced with corrugations in the manner described is for incorporation into concrete structures so as to produce voids. In this case the tubing is suitably 6 to 50 inches in diameter, and the strip is provided with three relatively wide corrugations. The corrugations give the tubing greater mechanical strength, permitting the use of a lighter gauge of strip so that the product is cheaper.

Yet another use of tubing produced in the manner described is to provide a semi-flexible cover for prestressed cables or rods for prestressed concrete. In this case the tubing is suitably 1 to 6 inches in diameter and the strip has 4 to 6 relatively narrow corrugations with the result that the tubing is flexible. Such tubing can also be used as trunking for electrical cables and can be bent to follow a desired path. In this case the tubing may suitably have a diameter up to 12".

I claim:

1. In a machine for producing locked seam helical tubing from continuous metal strip, said machine being of the type including a forming head having an internal surface shaped to define the helix pitch of the metal strip and adapted to guide the metal strip into a helical pitch so that, upon negotiating substantially a single turn of a helix, marginal parts of the metal strip are brought into mating relationship, said machine including pinching roller means adjacent said forming head for pinching together said mating marginal parts, said machine also including preforming roller means for forming the metal strip to the desired cross section prior to feeding thereof to the forming head, and further including at least one pair of opposed feed rollers disposed between said preforming roller means and said pinching roller means to draw the metal strip through the preforming roller means and push feed it to the forming head and past said pinching roller means, the improvement wherein said preforming roller means is arranged to form at least one longitudinal corrugation in the metal strip while leaving residual plane portions in the strip, at least one of said feed rollers being formed with at least one groove to provide free passage for said corrugation, said feed rollers including cylindrical feed roller portions in driving engagement with all of the residual plane portions in the strip, feeding of the metal strip being effected entirely by engagement of opposing cylindrical portions of said feed rollers with opposing sides of each of said residual plane portions in the metal strip, said preforming roller means for forming said corrugation being so oriented relative to said forming head that the metal strip is fed to the said forming head with said corrugation extending away from the internal surface of said head, whereby said strip is guided into a helical pitch by engagement of the residual plane portions of the strip with a cylindrical internal surface of the forming head, and said corrugation projects internally of the finished tubing.

References Cited

UNITED STATES PATENTS

| | | | |
|---|---|---|---|
| 2,282,176 | 5/1942 | Fay et al. | 72—50 |
| 3,229,487 | 1/1966 | Jensen | 72—50 |
| 2,862,469 | 12/1958 | Jensen | 72—49 |
| 3,132,616 | 5/1964 | Hale et al. | 72—49 |

CHARLES W. LANHAM, Primary Examiner

A. L. HAVIS, Assistant Examiner